United States Patent [19]

Colombo et al.

[11] 4,228,116
[45] Oct. 14, 1980

[54] PROCESS FOR PRODUCING REMOLDABLE PANELS

[75] Inventors: Giancarlo Colombo, San Giorgio su Legnano; Alberto Ardissone, Turin, both of Italy

[73] Assignee: G.O.R. Applicazioni Speciali S.p.A., Turin, Italy

[21] Appl. No.: 59,107

[22] Filed: Jul. 19, 1979

Related U.S. Application Data

[63] Continuation of Ser. No. 902,968, May 4, 1978, abandoned, which is a continuation-in-part of Ser. No. 453,957, Mar. 22, 1974, abandoned.

[30] Foreign Application Priority Data

Mar. 23, 1973 [CH] Switzerland .................. 4249/73

[51] Int. Cl.³ ............................................... B29D 23/00
[52] U.S. Cl. ..................... 264/119; 264/122; 264/175; 264/211; 264/176 R
[58] Field of Search ........... 264/211, 122, 119, 176 R, 264/134, 175, 331; 156/62.2

[56] References Cited

U.S. PATENT DOCUMENTS

| 225,822 | 3/1880 | Grossmann | 264/123 |
|---|---|---|---|
| 3,560,324 | 2/1971 | Quackenbush | 156/62.2 |
| 3,718,536 | 2/1973 | Downs et al. | 156/62.2 |
| 3,788,923 | 1/1974 | Soliman | 156/244 |
| 3,888,810 | 6/1975 | Shinomura | 260/17.4 R |

FOREIGN PATENT DOCUMENTS

| 2103685 | 8/1972 | Fed. Rep. of Germany | 264/123 |
|---|---|---|---|
| 516981 | 2/1972 | Switzerland | 264/134 |

Primary Examiner—Jay H. Woo
Attorney, Agent, or Firm—Holman & Stern

[57] ABSTRACT

Remoldable panels are produced by continuously plastifying and extruding an at least partially aggregated particulate mixture comprising about 40 to about 60% by weight of thermoplastic resin, preferably polypropylene, and about 60 to about 40% by weight of a particulate organic and preferably cellulosic filler such as wood particles, and rolling the web of extruded material prior to its solidification. The extruded and rolled web is cut to panels which can be used, for example, in the production of shaped articles such as dash boards or other components of automotive vehicles, furniture or parts thereof and the like, by pressing at elevated temperature or by other remolding methods conventionally used in the art of processing thermoplastic materials. Alternatively, the panels can be used for purposes where wood panels or ply-wood are normally employed.

6 Claims, 4 Drawing Figures

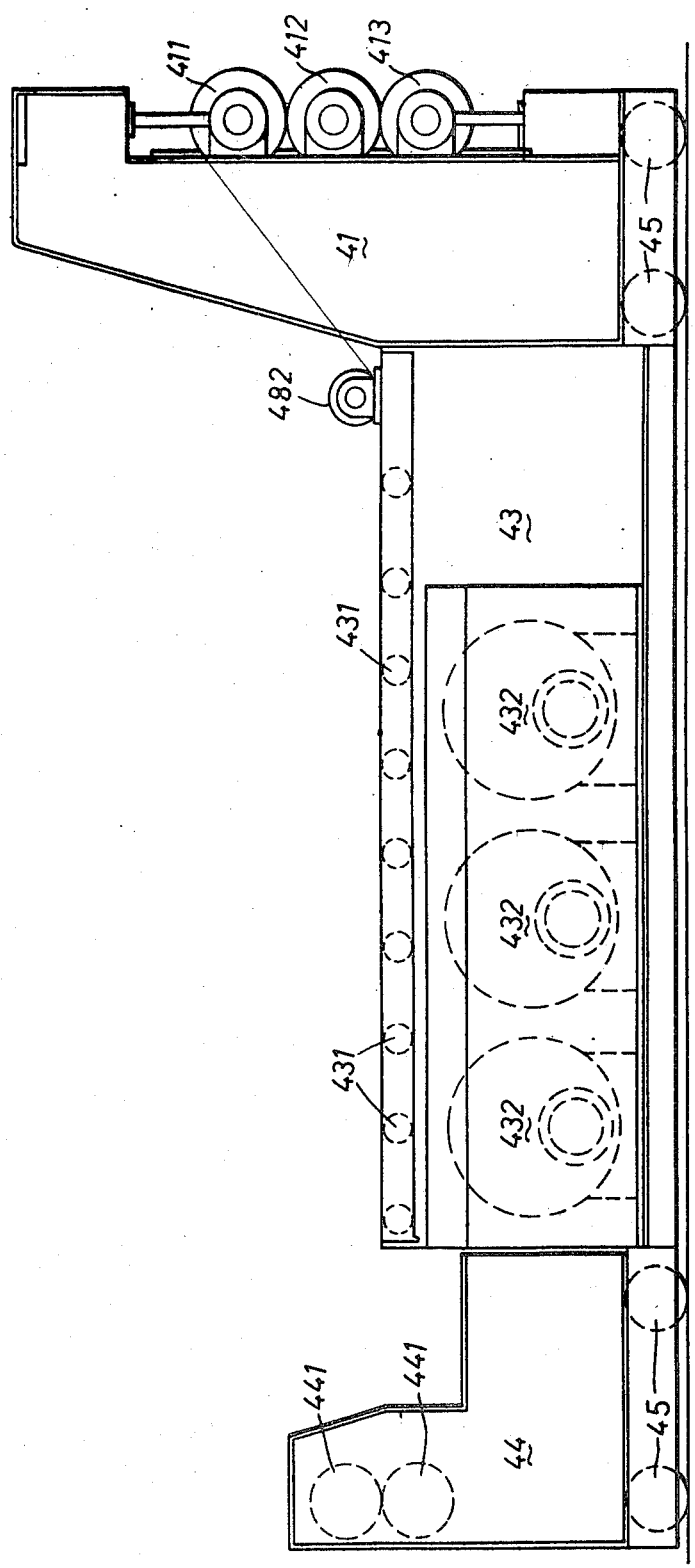

PROCESS FOR PRODUCING REMOLDABLE PANELS

This is a continuation of application Ser. No. 902,068, filed May 4, 1978, now abandoned, which in turn is a continuation-in-part of application Ser. No. 453,957, filed Mar. 22, 1974, now abandoned.

BACKGROUND OF THE INVENTION

This invention relates to composite plastic materials and specifically to a process for producing remoldable panels; the invention includes the panels obtained by such process, a plant for carrying out such process and the use of the panels for producing shaped articles.

Extrusion of thermoplastic polymer compositions is a well known and generally applied method for mass producing finished or semi-finished articles. Conventional thermoplastic compositions for extrusion processing contain a thermoplastic polymer as the main constituent. Inorganic or/and organic fillers may be used as minor constituents, i.e. in amounts of less than 40% by weight of the total composition. As the amount of filler increases it becomes increasingly difficult to process such compositions by extrusion. When using inorganic fillers, extrusion characteristics of the filler/resin composition can be improved by increasing the extrusion temperature. With organic fillers, however, this possibility is limited due to decomposition of most organic fillers, notably cellulosic materials at such elevated temperatures. Accordingly, it has generally been considered impossible to extrude compositions containing 40% by weight or more of such organic fillers and a thermoplastic polymer by normal extrusion methods.

BRIEF SUMMARY OF INVENTION

Accordingly, a general object of the invention is a process for extrusion processing of compositions containing as a major component, i.e. at least about 40% by weight, particulate organic fillers in addition to a thermoplastic polymer so as to economically produce panels which are capable of being remolded.

Another object is the production of remoldable panels having a generally wood-like appearance.

Further objects will become apparent as the specification proceeds.

It was found that the above and other objects can be achieved according to the invention by a process which includes the steps of
(1) forming a particulate mixture comprising (a) from about 40 to about 60% by weight of a thermoplastic polymer having a softening point of at least about 120° C., and (b) from about 60 to about 40% by weight of a particulate organic filler, said particulate mixture consisting at least in part, e.g. 20% by weight or more, of aggregates of said polymer and said filler,
(2) continuously plastifying and extruding said mixture at a temperature above the softening point of said polymer and below the temperature of substantial decomposition of said filler to produce a web, and
(3) rolling said web prior to its solidification.

Subsequently, the web can be cut so as to form panels of any desired size.

DEFINITIONS

The terminology used in this specification is defined as follows:

"Remoldable" is intended to define the capacity of a material to be molded or shaped by permanent deformation such as by pressing at elevated tempeeratures or by other thermomolding or thermoshaping methods, and excludes materials which contain thermosetting binders such as conventional fibre boards, wood-chip panels and the like.

The term "panel" refers to a generally flat stratiform structure which, under normal ambient conditions, has the general mechanical characteristics of ply-wood. Typical panels according to the invention will have a substantially uniform thickness or gauge in the range of from about 1 to about 10 mm, preferably about 2 to about 5 mm, a width in the range of from 100–2000 mm and a length of from 100–5000 mm.

"Thermoplastic polymer" refers to synthetic macromolecular substances which have molecular weights in the film forming range and which when heated soften and become distorted. Softening temperatures are determined by standard methods, e.g. ASTM E28. Upon cooling, such substances revert to their normally solid state. Typical examples are polyalkylenes such as polypropylene and polyethylene. Thermoplastic polymers suitable for the invention have softening temperatures of at least about 120° C., preferably at least about 150° C. Isotactic polypropylene is a particularly preferred thermoplastic polymer. High density polyethylene is another example.

"Particulate", both with regard to the filler and to the mixture, including the aggregates, refers to a solid in the form of particles, granules, beads, crains, or the like, with an irregular or regular shape. The particle size (largest dimension) is not very critical and may, for example, be in the range of from about 100 micron to about 100 mm. A preferred particle size range of the particulate filler is about 0.1 to about 4 mm.

"Organic fillers" are normally solid substances which are essentially stable both under the conditions of the subject process and the subsequent use of the panels produced. Further, such substances are inert with regard to the thermoplastic polymer. Preferred organic fillers are cellulosic materials such as comminuted wood particles in the above mentioned particle size range. Suitable wood particle materials include saw dust, saw chips, etc., obtained by comminution of soft woods or hard woods. Substantially dry fillers (water content less than about 10% by weight of the filler) are preferred. Fibrous fillers in the sense of having the general outer shape of fibers (length substantially greater than thickness) are not preferred as a dominant filler component.

The term "aggregate" refers to heterogeneous or composite aggregations or agglomerations of particles formed by any mechanism leading to mutual adhesion of components of the aggregate and includes agglomerated particles, melt bonded granulates, and the like. Specific examples and methods of producing such aggregates will be discussed in more detail below.

"Plastifying" refers to thermal and reversible softening of the mixed composition. While minor amounts of plastifiers may be added for specific purposes, the plastification in step (2) of the process will normally be due to heating of the polymer constituent for subsequent extrusion of the composition.

The term "web" is used to define a continuous extrudate having a cross-section corresponding essentially with the nozzle or die end of the extruder.

BRIEF DESCRIPTION OF THE DRAWINGS

The invention will be better understood and objects other than those set forth above will become apparent when consideration is given to the following detailed description thereof. Such description makes reference to the annexed drawings in which:

FIG. 3 is a side view of a preferred mixing device for forming the particulate mixture and FIG. 4 is a side view of an apparatus suitable for the rolling and cooling steps of the inventive process.

DETAILED DESCRIPTION OF THE DRAWINGS

Figure 1:
FIG. 1 is a flow chart of the steps of a preferred embodiment of the inventive process.

A preferred general embodiment of the inventive process is illustrated by means of the flow chart of FIG. 1. The boxes of the chart represent the following stages: (10) forming the particulate filler/polymer mixture including the aggregates; (11) reversibly plastifying the mixture to produce an extrudeable composition; (12) extruding the composition to produce a continuous web; (13) rolling the web while still in a plastic state; (14) cooling the web; (15) cutting the web to produce panels.

In the first step, or box 10, filler/polymer aggregates are formed and/or mixed with unaggregated particulate filler and polymer. As mentioned, such aggregates will constitute at least a portion, e.g. at least about 20% by weight, of the mixture which is subsequently plastified and extruded. While up to 100% of the mixture may consist of aggregates, such high percentages of aggregation are not critical. Generally, the advantage of increasing aggregation up to 100% is a faster rate of the subsequent extrusion.

Various methods of aggregation or agglomeration can be used including both "cold" (i.e. operating below the softening point of the resin) and "hot" (i.e. operating above the softening point of the resin) techniques. A first "cold" method is high-shear mixing such as by mixing the components in a turbomixer at temperatures below the softening point of the resin component. Normally, no external heatng is involved but the mixture will tend to become warmer due to the heat produced by the process. Such autogenic temperatures will normally range between about 40° and about 80° C. In most cases, external cooling is not required but temperatures of substantially above 100° C. are less preferred.

Surprisingly, it was found that if dry wood particles and resin particles are mixed under such conditions for a relatively short period, e.g. 3 minutes, visual examination of samples taken from the mixture indicates that resin particles adhere to the wood particles. While the mechanism is not fully understood, electrostatic phenomena or localized fusion may be involved. In any case, more than a mere surface contact adhesion is acheived because, when mixing is continued for extended periods, e.g. more than about 10 minutes, the percentage of agglomerated particles will decrease.

In other words, when using this method, filler and polymer particles are simply mixed under such high-shear conditions in the quantities required for the composition.

Figure 2:
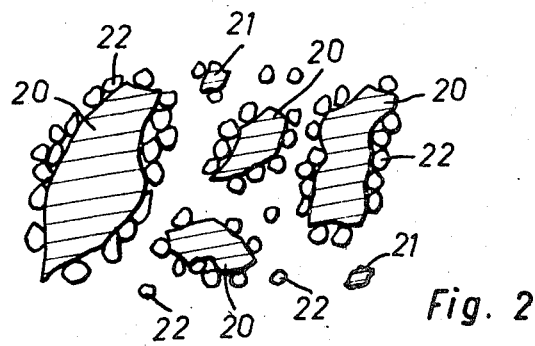
FIG. 2 is a semi-diagrammatic sectional view of aggregated filler/polymer particles obtained according to an embodiment of the inventive process.

FIG. 2 schematically illustrates the structure of the mixture obtained at a magnification of 10×. The mixture includes wood particles 20 aggregated or agglomerated with particles 22 of thermoplastic polymer. Particles 20 show a dense agglomeration with polymer particles, while other wood particles 21 are less agglomerated or not agglomerated at all. Also, such a mixture may include non-agglomerated polymer particles 22. It appears that a more pronounced agglomeration of this type is achieved with "core" type or relatively large central particles of one component, e.g. wood particles of up to about 4 mm, and relatively smaller "surrounding" partcles, e.g. polymer particles of about 200–400 micron.

A second "cold" method involves granulating a blend of polymer and filler by compaction, generally at room temperature, but sometimes with some autogenic temperature increase. Such granulating methods are known, e.g. for the production of animal foods, and can be used for forming an aggregated mixture according to the inventive process. Full aggregation, i.e. with substantially all particles of the mixture being formed by aggregates, can be achieved easily by this method of forming the aggregated particulate mixture.

"Hot" methods for producing suitably aggregated particulate mixtures include melt blending, e.g. by extrusion, and subsequent cutting, milling or otherwise comminuting the blend. A preferred method of this type involves use of comminuted "scrap" panel material which may, for example, be obtained as a by-product when panels according to the invention are remolded and processed for manufacture of shaped or molded articles.

Preferably, such scrap material or master will be comminuted to a particle size of less than about 10 mm prior to mixing with non-aggregated polymer and filler. The polymer: filler ratio of the scrap or master may be the same as that of the total particulate mixture for step (1) but this is not critical and the total polymer:filler ratio in step (1) can also be achieved by adding compensating amounts of non-aggregated components when forming the particulate mixture in step (1).

With reference to FIG. 1, box 10 of the flow chart can, for example, represent:

(a) mixing non-aggregated particulate components under high-shear conditions to produce an at least partially aggregated or agglomerated mixture;

(b) cold-granulation of non-aggregated components such as by compaction with subsequent comminution if required;

(c) hot blending of non-aggregated components with subsequent comminution;

(d) mixing non-aggregated particulate components with aggregated particles produced separately as in (b) and/or (c) above.

Figure 3:
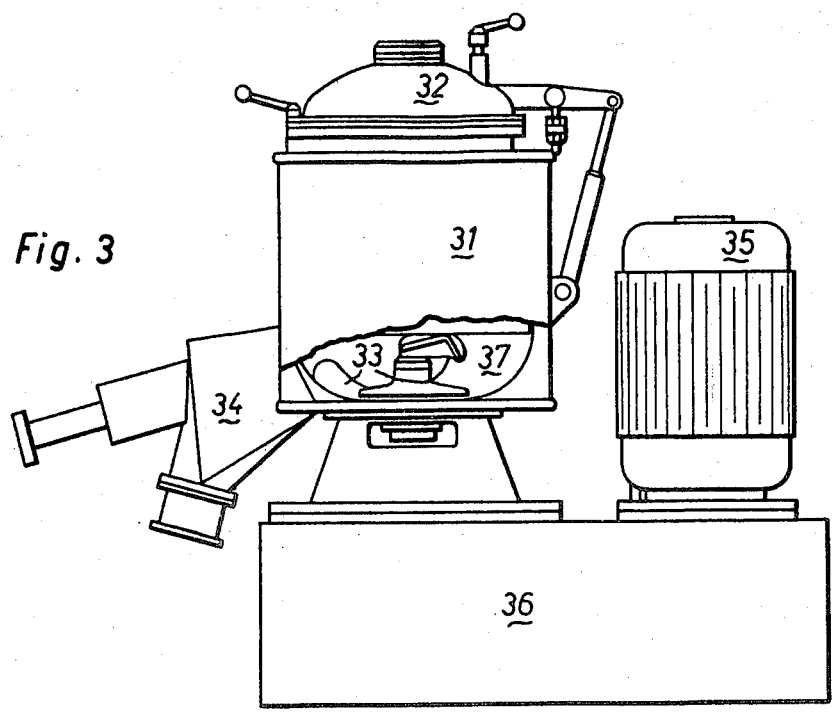

A preferred means for any high-shear mixing required for forming the particulate mixture is a turbomixer, an example of which is shown in FIG. 3. Casing 36 supports drive 35 operatively connected in a conventional manner (not shown) to rotate blades 33 within a cavity 37. The components of the mixture can be introduced into cavity 37 when lid 32 is opened. A cooling jacket 31 (partially broken-up to show the blade arrangement) can be used to receive a circulating heat transfer medium to prevent overheating of the components. The mixture produced can be discharged via outlet 34. Structure and operation of turbo-mixers of the type shown in FIG. 3 are known in the art so that a more detailed explanation is not required.

Suitable apparatus means for the plastifying and extruding step (boxes 11 and 12 of FIG. 1) are known in the art of extruding thermoplastic polymers. Generally, the plastifying and extruding step can be carried out in a single apparatus, such as a screw extruder, preferably a contra-rotating twin screw extruder. The particulate and at least partially aggregated mixture is introduced into the hopper of the extruder, plastified within the extruder cavity at a temperature above the softening point of the thermoplastic polymer component, e.g. 180°-200° C., and extruded through a die, preferably a slot die, at the extruding end of the apparatus.

The hot extrudate or web is now rolled (box 13 of FIG. 1) and cooled, or allowed to cool, for solidification prior to cutting. Alternatively, cutting may be effected prior to full solidification.

A suitable means for rolling and cooling the web is shown in FIG. 4. It includes a roller frame 41 supporting three contra-rotating rollers 411, 412 and 413, a guide roller 482, a plurality of support rollers 431 and a draw-off installation 44 comprising two draw-off rollers 441. Drives 432 for operating the driven rollers are arranged within frame 43.

In operation, the hot and plastic web extruded from the slot die (not shown) of a conventional twin screw extruder (not shown) is introduced into the nip between rollers 413 and 412, guided around roller 412 and through the nip between rollers 412, 411. The web is then led around roller 411 to guiding roller 482. Two contra-rotating draw-off rollers 441 supported by frame 44 cause the extruded and rolled web to be carried at the upper side of support rollers 431. While passing from roller 482 to rollers 441, the web will be allowed to cool and solidify, generally under normal ambient temperature. If desired, cooling may be intensified by blowers.

In order to obtain panels with a feel similar to wood, the coefficient of thermal conductivity of the extruded and rolled material should be lower than the heat transfer coefficient of the thermoplastic polymer. The dimension of the heat transfer coefficient $\lambda$ is [kilocalorics·meter$^{-1}$·hour$^{-1}$·°C.$^{-1}$] and polypropylene has a coefficient $\lambda$ (at room temperature) of about 0.19. When using wood particles of the type mentioned having a bulk density of 0.19-0.22 g/cm$^3$ and a coefficient $\lambda$ in the range of from 0.05-0.06, panels obtained will have a coefficient substantially below 0.19, e.g. 0.08 and lower.

The following examples are intended to illustrate but not to limit the invention.

EXAMPLE I

Wood particles having particle sizes of from 200 micron to about 4 mm and including little or no wood dust are dried to a water content of about 6±2% by weight. 50 parts by weight of such dried wood particles and 50 parts by weight of particulate commercial isotactic polypropylene having an average particle size of about 300 micron are introduced into a turbo-mixer of the type shown in FIG. 3. Then, the turbo-mixer is operated for a period of 6±3 minutes at about 1500 rotation per minute. The temperature of the mixture is allowed to rise to about 65°±15° C.

The particulate mixture obtained is discharged from the turbo-mixer. Visual examination of the mixture obtained at a magnification of 10× shows agglomerates of the type illustrated in FIG. 2 as well as non-agglomerated filler and polymer particles. The mixture is fed into the hopper of a counter-rotating twin screw extruder (I.C.M.A. San Giorgio, Italy, Extruder Type EB-4P) having a screw diameter of 105 mm, an effective length/diameter ratio of 18:1, a screw speed range of 10-60 RPM, a thrust bearing dynamic load of 54 metric tons, a production rate of 200-400 kg per hour and a heat energy uptake of 33 Kilowatt. The plastification and extrusion temperature is 195°±10° C. The hot and still plastic extruded web having a thickness of about 3 mm is fed into and through an installation as shown in FIG. 4. The rolled web has a thickness of about 2.5±0.2 mm. After passing the draw-off rollers it is cut into panels.

The panel material obtained has a tensile strength of 155±30 kg/cm$^2$, a bending strength or rigidity of 310±20 kg/cm$^2$ and an elasticity modul of bending of 22,500±2500 kg/cm$^2$, all values measured at room temperature (20°-25° C.). Water uptake of the material is low and typically about 2.5%. The coefficient of thermal conductivity $\lambda$ is substantially below 0.19.

A number of panels so obtained is used for the production of dash boards for automobiles by reheating to soften the panels and then pressingly deforming them in a die press. Also, the panels can be used similarly as ply-wood, notably when a high resistance to water is desired.

EXAMPLE II

The following components are charged into a turbo-mixer:
- 50 kg polypropylene (as in Example I)
- 40 kg saw dust or wood powder (particle size 150-300 micron, substantially spherical particle shape, water content below 8% by weight)
- 40 kg agglomerate (particle size 4-5 mm)
- 4 kg carbon black (pigment grade).

The agglomerate consists of 50 parts by weight polypropylene as above, 40 parts by weight of wood powder as above and was obtained by milling and sieving scrap of panel material.

The above components are mixed in the turbo-mixer at temperatures between 45° and 80° C. until a substantially uniform distribution of the components is achieved. Depending upon the time of mixing in the turbo-mixer, some aggregation of the particulate polymer and the wood dust on the scrap granules can be observed but such aggregation is not critical in that the scrap granules constitute the essential aggregates.

The mixture obtained is processed essentially as in Example I and the product obtained has substantially equivalent characteristics as the product of Example I except that it has a darker appearance.

EXAMPLE III

The following components are processed in accordance with Example II:
- 40 kg polypropylene (as in Example I)
- 60 kg wood particles (particle size 300 micron to 4 mm, particle shape generally chip-like, water content below 8% by weight)
- 30 kg agglomerate (particle size 4-6 mm).

The agglomerate was produced from panel scrap as explained in Example II, except that the scrap consisted of 40% by weight of polypropylene and 60% of wood particles as above.

EXAMPLE IV

The following components are processed in accordance with Example II:

50 kg polypropylene (as in Example I)
50 kg wood particles (as in Example III)
40 kg agglomerate (particle size 4–6 mm).

The agglomerate was obtained from panel scrap consisting of equal parts by weight of polypropylene and wood particles of the same type as used for the non-agglomerated components of this Example.

EXAMPLE V

The procedure is substantially that of Example I with the modification that the components are blended and then granulated in a conventional granulating press at temperatures below the softening point of the polymer to produce a granulate with particle sizes between 2 and 8 mm. This granulate is then plastified, extruded and rolled to produce panels similar to those of Example I. It is observed that the extruding speed in this Example could be increased by 20% without disadvantageous effects thus providing for improved efficiency of the extrusion process.

While the invention has been explained mainly in connection with polypropylene as the thermoplastic polymer and wood particles as the filler, it is understood that the compositions, components and operating conditions of the above Examples can be modified in manners obvious to the expert. For example, other fillers, thermoplastic polymers, additives, lubricating agents, anticombustion agents, stabilizers, etc., can be used to prepare the mixture.

What is claimed is:

1. A process for producing remoldable panels from a thermoplastic polymer and an organic filler, said process including the steps of:
    (1) providing a mixture comprising from about 40 to about 60% by weight of said thermoplastic polymer in particulate form, having a particle size in the range of from about 200 microns to about 400 microns and a softening point of at least about 150° C., and from about 60 to 40% by weight of substantially dry sawdust having a particle size range of from about 0.1 to 4 mm as an organic filler, aggregatingly combining at least a part of said particulate thermoplastic polymer and said sawdust to form a mass of discrete composite particles each including one sawdust particle as a core and a plurality of thermoplastic particles adhering to the surface of said core particle,
    (2) continuously plastifying and extruding said mixture by heating same to a temperature above the softening point of said thermoplastic polymer and below the temperature of substantial decomposition of said sawdust, and then extruding said mixture to form a web, and
    (3) calendering said web prior to its solidification.

2. The process of claim 1 wherein said thermoplastic polymer is polypropylene.

3. The process of claim 2 wherein said polypropylene has a particle size of about 300 microns.

4. The process of claim 1 wherein said composite particles are produced by high-shear mixing during a period of from about 3 minutes to less than 10 minutes.

5. The process of claim 1 wherein said particulate thermoplastic polymer and said sawdust are aggregatingly combined such that said plurality of thermoplastic particles adhere to and only partially cover the surface of said core particle leaving substantial uncovered portions of the surface of said core particle between said thermoplastic particles.

6. The process of claim 1 wherein said particulate thermoplastic polymer and said sawdust are aggregatingly combined to form composite particles as shown in FIG. 2.

* * * * *